July 24, 1956
W. VAUGHAN
2,755,553
LENS MARKING DEVICES
Filed June 23, 1951
3 Sheets-Sheet 1
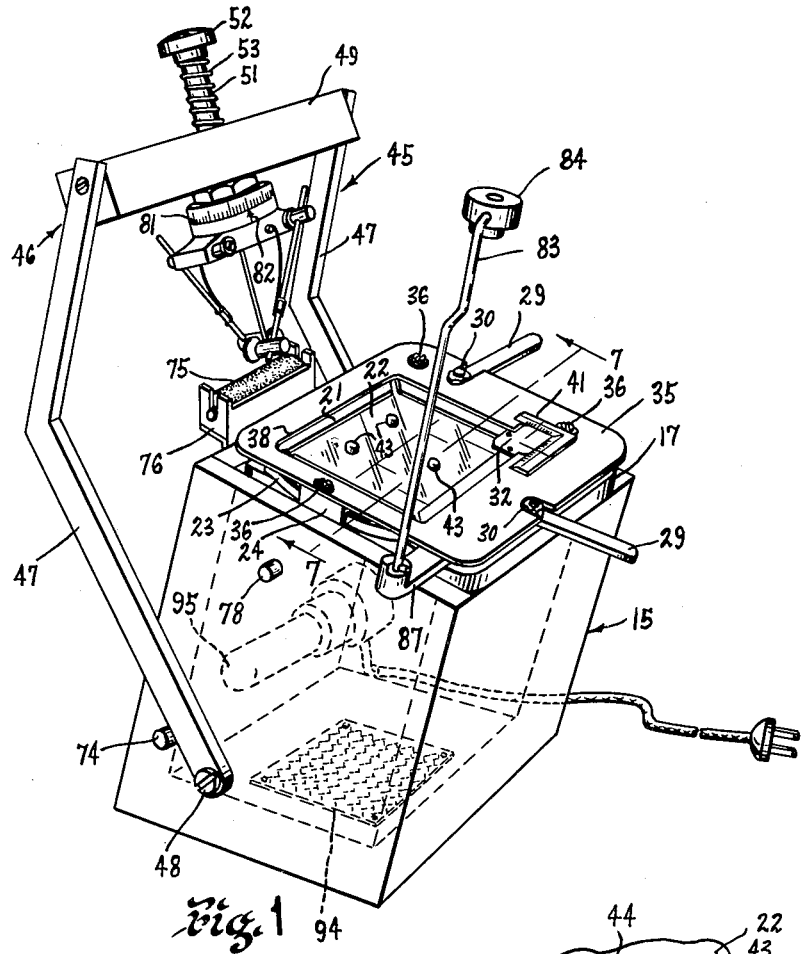
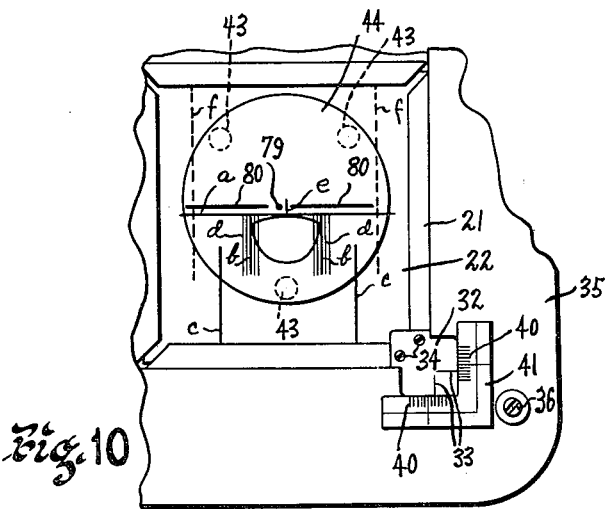
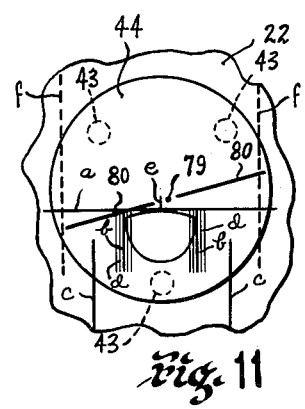
INVENTOR
WILLIAM VAUGHAN
BY
Louis L. Gagnon
ATTORNEY July 24, 1956  W. VAUGHAN  2,755,553
LENS MARKING DEVICES
Filed June 23, 1951  3 Sheets-Sheet 2

INVENTOR
WILLIAM VAUGHAN
BY
*Louis H. Gagnon*
ATTORNEY

July 24, 1956  W. VAUGHAN  2,755,553
LENS MARKING DEVICES
Filed June 23, 1951  3 Sheets-Sheet 3
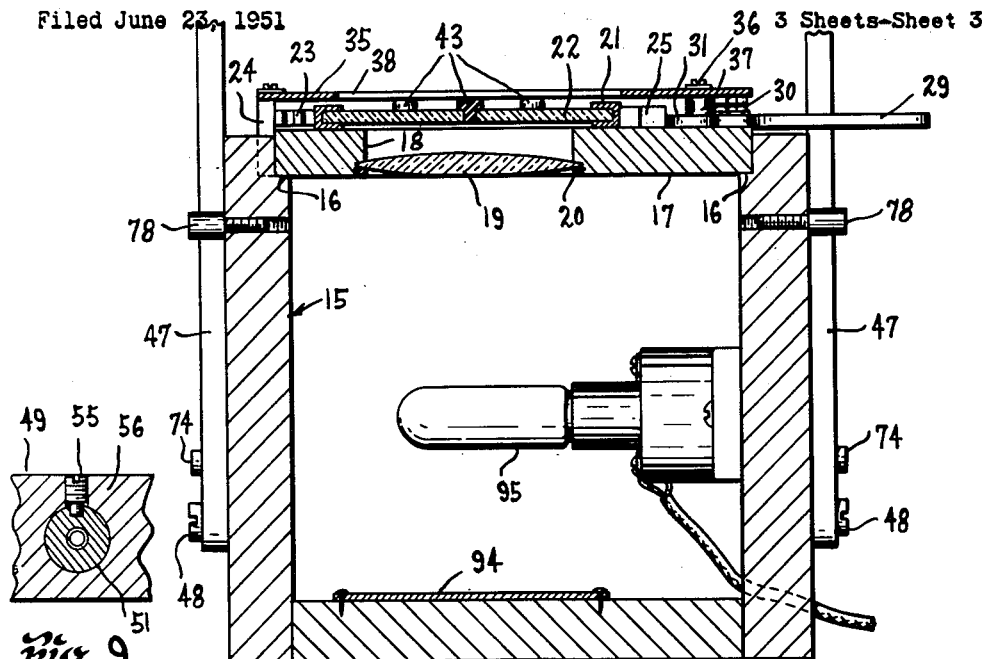
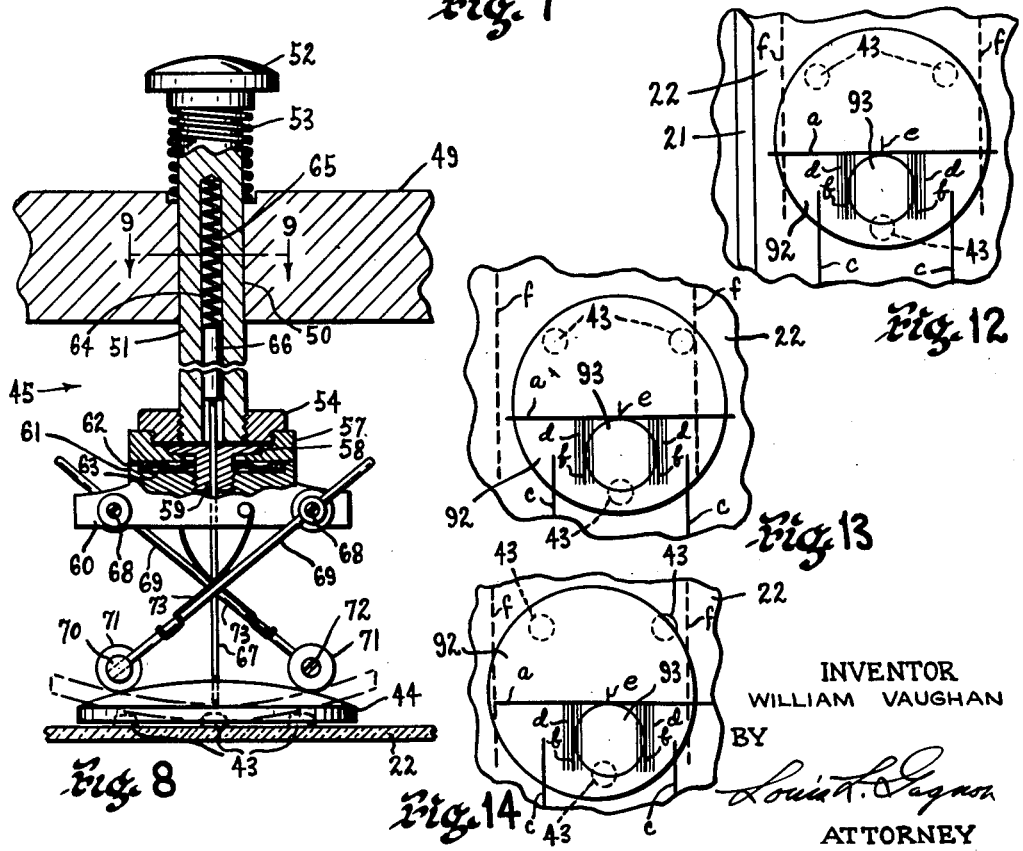
INVENTOR
WILLIAM VAUGHAN
BY
Louis L. Gagnon
ATTORNEY United States Patent Office 2,755,553
Patented July 24, 1956

2,755,553

LENS MARKING DEVICES

William Vaughan, Woodstock, Conn., assignor to American Optical Company, Southbridge, Mass., a voluntary association of Massachusetts Application June 23, 1951, Serial No. 233,128

6 Claims. (Cl. 33—36)

This invention relates to improvements in devices for determining, indicating and marking the positional characteristics of a semi-finished lens and has particular reference to devices for locating and marking the optical center and axis of a semi-finished lens having a bifocal segment thereon.

One of the principal objects of this invention is to provide an improved device for supporting a semi-finished bifocal lens in predetermined position and embodying adjustment means for decentering said semi-finished lens and an improved marking device for subsequently applying to the surface of said semi-finished lens identifying characteristics indicating the center and axis thereof.

Another object is the provision of a device of the above character embodying a supporting table for supporting a semi-finished bifocal lens blank in initially centered position, said table being slidable to decenter said semi-finished lens blank a predetermined amount, and a marking device for subsequently providing said semi-finished blank with center and axis indications.

Another object is to provide a device of the above character wherein said marking device for marking the center and axis of the semi-finished lens on the surface thereof is so constructed and arranged with respect to a protractor scale that any desired predetermined axis may be automatically marked on the semi-finished lens.

Another object is to provide a device of the above character embodying sighting means carried by a transparent table and movable therewith during the decentering operation whereby a semi-finished lens carried by said table may be viewed through said sighting means when in any adjusted position without introduction of error due to parallax.

A further object is to provide a device of the above character which is relatively simple in construction, efficient in operation and comparatively inexpensive to manufacture.

Other objects and advantages of the invention will become apparent from the following description taken in connection with the accompanying drawings in which:

Fig. 1 is a perspective view of a device embodying the invention;

Fig. 7 is a fragmentary sectional view taken on line 7—7 of Fig. 1 looking in the direction of the arrows;

Fig. 8 is a fragmentary view partly in section of the marking device;

Fig. 9 is a fragmentary sectional view taken on line 9—9 of Fig. 8;

Fig. 10 is a fragmentary top plan view of a portion of the device illustrating the method of initially locating a lens in position for marking;

Fig. 11 is a fragmentary top plan view of a lens in position on the device, illustrating axis and center marks located thereon at a predetermined angular position; and Figs. 12, 13 and 14 are fragmentary top plan views generally similar to Fig. 11 illustrating diagrammatically the method of decentering a lens having a round segment thereon.

Figure 2:
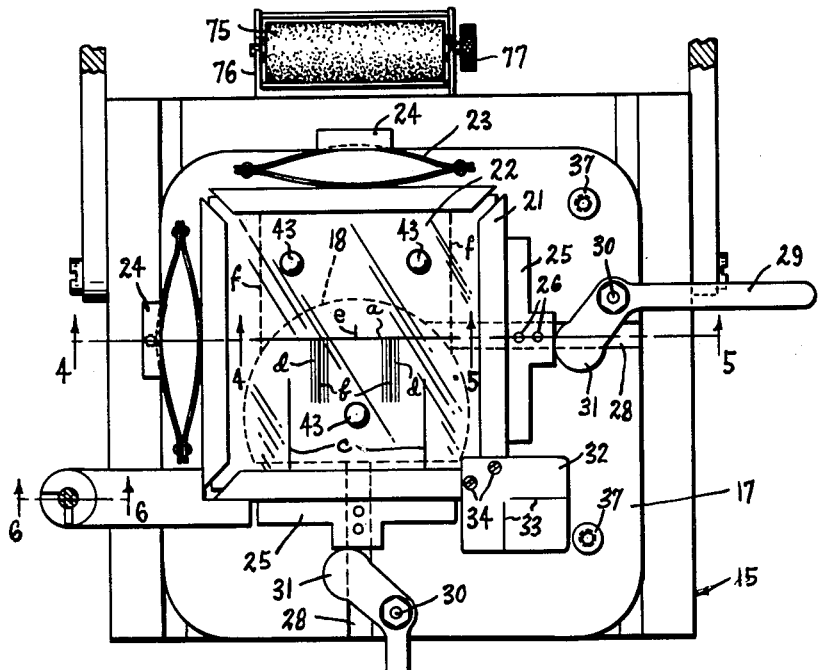
Fig. 2 is a top plan view of the device illustrated in Fig. 1 with a portion of the marking device broken away and with the top plate removed.

Referring more particularly to the drawings wherein like characters of reference designate like parts throughout the several views, the illustrated embodiment of the invention comprises a box-like structure 15 which is open on the top and is formed with a groove 16 (Figs. 2, 4, 5 and 7) around the inner peripheral edge of the top opening and in which is fixedly secured a base plate 17. The base plate 17 is provided with an aperture 18 therein in which is positioned a condensing lens 19 which is held therein by any suitable means such as a ring-like retainer 20 (Fig. 7). A transparent table 22 is located on the upper surface of the base plate 17 over the aperture 18 and is encircled by a rigid frame or rim 21. The table 22 is slidably mounted on the surface of the base plate 17 and is positioned with one end and one side surface thereof against respective leaf-spring devices 23 which are fixedly secured in position adjacent the surface of the base plate 17 by means such as upwardly extending retaining members 24 which are provided with grooves therein in which one of the leaves of the respective leaf-spring devices 23 is fixedly held. The table is thus continually urged by said springs toward a pair of blocks 25 which are slidably mounted on the surface of the base plate in opposition to the spring devices 23. The blocks 25 each have a slide member 27 attached to the lower surface thereof as by screws 26, which slide member 27 is adapted to slide longitudinally within a groove 28 formed in the surface of the base plate 17 whereby as the block 25 is moved in a direction toward or away from the opposed spring device 23 the slide member 27 will move in its respective groove 28. A pair of cam levers 29 are pivotally attached as at 30 to the base plate 17 and are provided with cam portions 31 which are adapted to engage the respective blocks 25 whereby when the cam levers 29 are pivotally moved in one direction about the axis of the pivots 30 the cam portions 31 thereof will urge the blocks 25 and consequently the table 21 toward the opposed spring devices 23, consequently compressing the spring devices 23. When the cam levers 29 are operated in the reverse direction, the cam portions 31 thereof will tend to leave the blocks 25 whereupon the inherent tension of the spring devices 23 will urge the table 21 toward the levers 29. An indicating plate 32 carrying indicating marks 33 thereon is secured as by screws 34 to one corner of the table 21 and an apertured cover plate 35 is secured as by screws 36 to spacers 37 carried by the base plate 17 and thereby held in overlying relation therewith and with the frame 21 and transparent plate 22.

Figure 3:
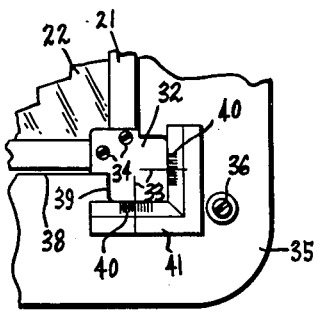
Fig. 3 is an enlarged top plan view of the millimeter scale arrangement for indicating amount of decentering.
Figure 4:
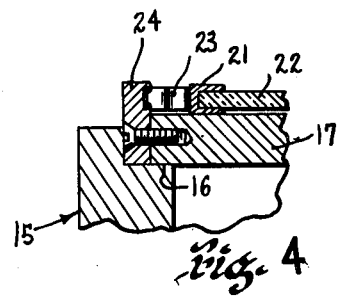
Fig. 4 is a fragmentary sectional view taken on line 4—4 of Fig. 2 looking in the direction of the arrows.
Figure 5:
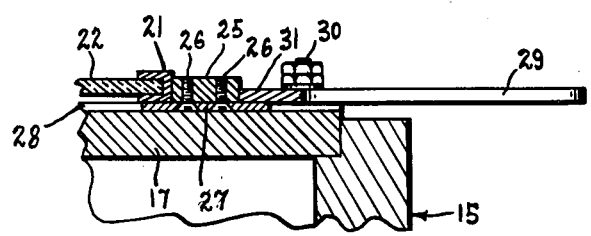
Fig. 5 is a fragmentary sectional view taken on line 5—5 of Fig. 2 looking in the direction of the arrows.

The cover plate 35 is provided with an enlarged central aperture 38 whereby the table 22 can be viewed throughout its entire extent of movement. A corner portion of the cover plate 35 is also removed, as indicated by the recess 39 in Fig. 3, whereby the indicating lines 33 on the indicating plate 32 can be aligned, during the adjustment of the table 22, with graduations 40 on an L-shaped scale 41 bordering two sides of the recess 39. Thus, as the table 22 is moved upon operation of the levers 29 by the operator of the device, the extent of movement thereof is clearly indicated on the scale 41.

The table 22 is provided with a series of lines permanently affixed thereto in the form of a long horizontal line a and two shorter spaced lines b extending downwardly at right angles therefrom and two more widely spaced lines c extending upwardly from the front edge of the table 22 toward the horizontal line a. The short lines b have on each side thereof a pair of finer parallel lines d of equal length. A short center indicating line e extends upwardly from the horizontal line a.

Three small pads 43 formed of rubber or other soft material are cemented or otherwise attached to the table 22 and on the pads 43 is positioned a lens blank 44 to be marked. The lens blank is finished on one side, generally but not necessarily the convex surface, and is positioned with its unfinished surface positioned against the pads 43.

In operating this portion of the device, the semi-finished lens blank 44 is adjusted on the pads 43 until its bifocal segment is accurately centered with respect to lines b and a on the table 22.

The lens blank is then adjusted according to its prescriptive requirements by operating the cam levers 29 to move the table 22. If decentration of a controlled amount is required, the desired indication is registered on horizontal portion of scale 41, which decentering may be done either before or after the blank 44 has been positioned on the table 22. The height of segment is controlled by vertical portion of scale 41. As an example, if the segment is to be decentered 2 millimeters horizontally and 2 millimeters down, the scale 41 will register as shown in Fig. 10.

At this time the marking device 45 is operated to mark the center and axis on the lens surface. The marking device 45 comprises a substantially U-shaped frame 46 having the ends of its arm portions 47 pivoted as at 48 to the sides of the base 15. The cross member or bight 49 of the frame 46 has an opening 50 therethrough (Fig. 8) in which is slidably located a shaft 51 having a knob 52 on the upper end thereof. A coiled spring 53 is positioned over the shaft 51 between the knob 52 and adjacent surface of the bight 49 and functions to yieldably urge the shaft 51 upwardly in the opening 50. A nut 54 is threadedly attached to the lower end of the shaft 51 and prevents withdrawal of the shaft 51 from its position within the opening 50. The shaft 51 is restrained from rotative movement by means of a key 55 (Fig. 9) which is carried by the bight 49 and which engages a longitudinal groove 56 in the shaft 51. Thus the shaft 51 can move longitudinally in the opening 50 without rotation.

The nut 54 is provided with an external threaded portion on which is secured a collar 57 having a groove formed in its upper side adjacent its inner periphery in which is located a rotatable disc 58 having a downwardly extending hub 59 thereon. The hub 59 is externally threaded and thereupon carries a block 60. The block 60 has an upper disc-like portion 61 which is of substantially the same diameter as the collar 57 and is adapted to rotate with the member 58. A circular recess 62 in the upper surface of the portion 61 of the block contains a spring washer 63 which, by frictionally engaging the collar 57, serves to yieldably restrain the block 60 from rotative movement with respect to the collar 57.

The shaft 51 is provided with a central longitudinal bore 64 in which is positioned a coiled spring 65 which through engagement with the enlarged end 66 of a spindle 67 urges the spindle 67 downwardly through an opening in the disc 58, hub 59 and block 60. The spindle 67 is thus normally yieldably urged downwardly.

Pivotally carried by pins 68 mounted transversely in and adjacent the ends of the block 60 are a pair of downwardly extending arms 69, one on each side of the block. The lower ends of the arms each have secured thereto a fixed hub 70, the respective hubs 70 being directed toward the opposite side of the block 60 and carrying thereon as by screws 72 a roller 71 formed of fiber or the like having a beveled or knife-like peripheral edge. One end of each of a pair of springs 73 is attached to a respective arm 69, the springs having their opposed ends fixedly secured to the adjacent side of the block 60. The springs 73 normally act upon the arms 69 to urge the rollers 71 toward one another, the rollers, in normal inoperative position, being located in a plane through the center of the spindle 67.

The frame 46 is normally positioned rearwardly of the device with the arms 47 resting against fixed stops 74 carried by the base 15. When in this position, the rollers 71 and end of the spindle 67 are positioned slightly above an ink pad 75 (Figs. 1 and 2) rotatably carried in an ink well 76 attached to the rear of the base 15. The well 76 is partially filled with a marking fluid and the pad 75 is provided with a knob 77 at one end thereof whereby the pad can be rotated to immerse its surface in the fluid.

The operator can apply fluid to the rollers 71 and spindle 67 by pressing the knob 52 which will cause the rollers 71 to engage the pad 75 and to roll outwardly therealong against the tension of springs 73. The end of the spindle 67 meanwhile simultaneously engages the pad 75 and is retracted as pressure is applied to the knob 52 by the operator.

The frame 46 is then moved forwardly on its pivots 48 to a position where the arms 47 engage a second pair of stops 78 carried by the base 15. Upon applying pressure to the knob 52, the operator can cause the rollers 71 and end of the spindle 67 to engage the upper surface of the lens blank 44 and thereby deposit marking fluid thereupon, the end of the spindle making a dot to indicate the center and the rollers making aligned lines indicating the axis of the lens blank. This is illustrated in Fig. 10 wherein the center is shown by the dot 79 and the axis by lines 80. It is apparent that with this construction identifying characteristics can be applied either to a concave or convex surface.

After the markings have been made on the blank 44, the marking device 45 is returned to normal inoperative position as shown in Fig. 1 and the lens blank removed.

In instances where the prescriptive surface to be formed on the lens blank 44 is such that the axis is angled with respect to the horizontal line "a," this can be located by rotating the block 60 of the marking device 45 the desired amount as determined by a degree scale 81 provided on the outer periphery of the collar 57 and which functions cooperatively with an arrow 82 on the disc portion 61 of the block 60. Thus, an angled axis line can be subsequently marked on a lens blank as shown in Fig. 11.

Figure 6:
Fig. 6 is a fragmentary sectional view taken on line 6—6 of Fig. 2 looking in the direction of the arrows.

To aid in initially locating a lens blank 44 in proper position on the table 22, there is provided a sighting device embodying an upwardly extending post 83 having an eyepiece 84 at its upper end, the eyepiece having an accommodation lens whereby the operator can sight therethrough onto the lens blank 44. The lower end of the rod 83 extends through a bearing 86 (Fig. 6) formed on one end of an arm 87 attached as by soldering or the like to the rim 21 encircling the table 22. The rod is provided with a pin 88 which is adapted to rest against a shoulder 89 formed on the upper end of the bearing 86 when the eyepiece 84 is properly positioned above the lens blank 44. The rod 83 is rotatable in the bearing 86, however, so that the sighting means may be moved out of the way when the marking device is to be used. A spring washer 90 mounted over the lower end of the rod 83 is held against the bottom of the bearing 86 by a washer and screw arrangement 91 secured to the end of the rod 83. Thus, sufficient tension is provided for retaining the sighting means in adjusted position.

To render the segment on a lens blank more clearly discernible there is provided a target 94 having an irregular pattern thereon, the target 94 being affixed to the interior of the base 15 (Figs. 1 and 7) in line with the aperture 18 in the base plate 17 so that when the lens blank is being viewed through the eyepiece 84 it will be seen through the blank and will cause the outline of the segment to become more apparent. The device is also preferably provided with illuminating means 95 for illuminating the target 94.

A decided advantage is found in the use of the presently described device for decentering lenses having circular segments. Most prior known methods teach decentering by mounting the lens blank and aligning the segment with a target, decentering by moving the entire blank the desired amount with respect to the chart, and then subsequently realigning the segment with the chart by rotating the lens blank about its center. This, however, introduces some error due to the fact that the segment moves through an arcuate path as the blank is rotated. The present invention overcomes this objection since, as is illustrated in Figs. 12, 13 and 14, a lens blank 92 of this type having a round segment 93 can be initially adjusted on the table 22 to the position shown in Fig. 12 wherein the segment is properly located between lines $a$ and $b$ and the marginal edges of the blank are equally spaced from the fixed vertical lines $f$ which are located on the base plate 17. The table 22 with the lens blank 92 thereon is then adjusted the desired predetermined amount such as shown in Fig. 13. Then the blank 92 is rotated about the center of the segment 93 to a position where the marginal edges again are properly spaced with respect to the fixed lines $f$ as shown in Fig. 14. In this way the center of the segment 93 remains at all times in the same plane parallel to the guide line $a$ and, therefore, does not move arcuately as taught by the prior art.

From the foregoing it will be seen that all of the objects and advantages of this invention have been accomplished. However, it will be apparent that many changes may be made in the details of construction and arrangement of parts shown and described without departing from the spirit of the invention as expressed in the accompanying claims. Therefore, it is to be understood that all matter set forth or shown in the accompanying drawing is to be interpreted as illustrative and not in a limiting sense.

I claim:

1. A device of the character described comprising a base, a movable table on said base for supporting a bifocal lens blank, guide lines on said table with which said lens blank may be aligned, manual operating means connected with said table for moving said table a predetermined amount on said base relative to a predetermined point on the base while holding the aligned portion of the lens blank on said table for decentering said lens blank, and a marking device attached to said base having a center marking spindle and a pair of axis marking rollers adjacent each side of said center marking spindle each mounted for radial motion in a common plane with said center marking spindle, said marking device being yieldably movable toward said table to bring its center marking spindle into engagement with said lens blank at said predetermined point for marking the center in the form of a dot and simultaneously bring said axis marking rollers into rolling contact with said lens blank to cause said rollers to mark an axis in the form of dash lines, one at each side of said center and said dash lines being positioned so as to lie substantially in a single plane with said dot, said marking device being rotatable about its center marking portion to cause repetitive axis markings to be applied at predetermined angles with respect to said center mark while said center mark is simultaneously and repetitively applied at said predetermined point.

2. In a device of the character described provided with a base having means for supporting a lens blank and permitting said lens blank to be moved a predetermined amount on said base for decentering said lens blank, a marking device attached to said base and yieldably movable toward said means and into engagement with said lens blank for marking on the surface thereof identifying characteristics indicating the center and axis thereof, said marking device comprising a plunger longitudinally movable toward and away from said means, a rotatable block carried by said plunger, a pair of arms pivotally carried by said block and carrying rollers thereon for applying identifying characteristics indicating the axis upon the surface of said lens blank, a retractable spindle carried by said plunger and adapted to extend toward said means for applying an identifying characteristic indicating the center upon the surface of said lens blank, said rollers being disposed in a common plane with the marker and on opposed sides thereof and mounted for radial displacement in said plane, spring means for normally retaining the device in inoperative position whereby upon manual operation of said plunger in opposition to said spring means said spindle will engage said lens and apply thereto an identifying characteristic in the form of a dot for indicating the center thereof and said rollers will simultaneously engage said lens blank and be further caused to roll outwardly from said spindle in said common plane therewith and apply to said lens blank identifying characteristics in the form of dash lines extending outwardly from said dot for indicating the axis of said lens blank.

3. In a device of the character described provided with a base having means for supporting a lens blank and permitting said lens blank to be moved a predetermined amount on said base for decentering said lens blank, a marking device attached to said base and yieldably movable toward said means and into engagement with said lens blank for marking the center and axis on the surface thereof, said marking means being adjustable whereby repetitive axis marks may be applied at predetermined angles with respect to said center mark while said center mark is simultaneously and repetitively applied in a fixed prelocated position, said marking device comprising a plunger longitudinally movable toward and away from said means, a rotatable block and a retractable spindle carried by said plunger, said spindle adapted to extend toward said means, a pair of arms each having one end pivotally connected to said block and carrying rollers at the opposed ends thereof, said rollers being disposed adjacent each side of said spindle in a common plane therewith and mounted for radial motion in said plane, tensioning means on said arms for normally retaining said rollers in adjacent relation to said spindle, spring means for normally retaining the device in inoperative position whereby upon manual operation of said plunger in opposition to said spring means said spindle will engage said lens and apply thereto an identifying characteristic in the form of a dot for indicating the center thereof and said rollers will simultaneously engage said lens blank and be further caused to roll outwardly, in opposition to said tensioning means, from said spindle along a predetermined axis and apply to said lens blank identifying characteristics in the form of dash lines lying substantially in a single plane with said dot and extending outwardly from adjacent said dot for indicating the axis of said lens blank.

4. In a device of the character described provided with a base having means for supporting a bifocal lens blank and for decentering said lens blank, a marking device attached to said base and yieldably movable toward said means and into engagement with said lens blank for marking the center and axis on the surface thereof, said marking means being adjustable whereby repetitive axis marks may be applied at predetermined angles with respect to said center mark while said center mark is simultaneously and repetitively applied in a fixed prelocated position, said marking device comprising a plunger longitudinally movable toward and away from said means, a rotatable block carried by said plunger, indicating means on said plunger and block for indicating the adjusted position of said block with respect to said plunger, a retractable spindle carried by said plunger and adapted to extend toward said means for applying an identifying characteristic indicating the center upon the surface of said lens blank, a pair of arms pivotally carried by said block having rollers thereon, said rollers being disposed in a common plane with said spindle on opposed sides thereof and mounted for radial displacement in said plane for applying identifying characteristics indicating the axis of said lens blank, spring means for normally retaining the marking device in an inoperative position whereby upon manual operation of said plunger in opposition to said spring means, said spindle will engage said lens blank and apply thereto an identifying characteristic in the form of a dot indicating the center thereof and said rollers will simultaneously engage said lens blank and roll outwardly from said spindle in said common plane and apply to said lens blank axis identifying characteristics in the form of dash lines extending outwardly from adjacent said dot for indicating the axis of said lens blank, said dash lines and dot lying substantially in a single plane and said axis identifying characteristics being angled with respect to said center identifying characteristic in accordance with the rotational adjustment of said block relative to said plunger.

5. A device of the character described comprising a base, a table on said base for supporting a lens blank having a plurality of fields of different powers, guide means on said table with which one of said fields on said lens blank may be correlated, manual operating means conneted with said table for moving said table a predetermined amount on said base relative to a fixed location for decentering said lens blank while holding the position of the lens blank thereon, and a marking device attached to said base having a center marking portion and a pair of axis marking rollers adjacent each side of said center marking portion each mounted for radial motion in a common plane with said center marking portion, said marking device being yieldably movable toward said table to bring its center marking portion into engagement with said lens blank along said fixed location for marking the center and simultaneously bring said axis marking rollers into rolling contact with said lens blank to cause said rollers to form an axis line on the surface thereof, whereby said axis line and center will lie substantially in a single plane, said marking means being adjustable about its center marking portion to cause repetitive axis marks to be applied at predetermined angles with respect to said center mark while said center mark is simultaneously and repetitively applied along said fixed location.

6. A device of the character described comprising means for supporting an article for the application of surface markings thereon and a marking device for placing said markings on said article, said marking device embodying a plunger having a block and a center marking portion carried thereby, a pair of axis marking members pivotally mounted on said block one at each side of said center marking portion and having a pair of axis marking rollers mounted for radial motion in a common plane with said center marking portion and disposed adjacent each side thereof, said marking device being yieldably movable toward said article to bring its center marking portion into engagement therewith to form a dot and to simultaneously bring the rollers of said axis marking members into rolling contact with said article whereby said axis marking members will pivot on said block and cause each of said rollers to roll outwardly from said center marking portion to form spaced axis lines which will lie substantially in a common plane with said dot.

References Cited in the file of this patent
UNITED STATES PATENTS

| Number | Name | Date |
|---|---|---|
| 528,476 | Grundy | Oct. 30, 1894 |
| 679,070 | Flora | July 23, 1901 |
| 1,164,795 | Emerson | Dec. 21, 1915 |
| 1,210,606 | Collinson | Jan. 2, 1917 |
| 1,292,121 | Stead | Jan. 21, 1919 |
| 1,320,542 | Gilbert | Nov. 4, 1919 |
| 1,424,941 | Pirwitz | Aug. 8, 1922 |
| 2,087,957 | Pelphrey | July 27, 1937 |
| 2,146,599 | Smith | Feb. 7, 1939 |
| 2,178,516 | Brenner | Oct. 31, 1939 |
| 2,301,035 | Golderer | Nov. 3, 1942 |
| 2,348,858 | Sheehy | May 16, 1944 |
| 2,535,633 | Hobbs | Dec. 26, 1950 |
| 2,587,585 | Ayres | Mar. 4, 1952 |
| 2,647,318 | Grondona | Aug. 4, 1953 |